(12) United States Patent
Honda (10) Patent No.: US 6,285,885 B1
(45) Date of Patent: Sep. 4, 2001

(54) MOBILE COMMUNICATION APPARATUS WITH DISTANCE MEASURING UNIT

(75) Inventor: Shoichiro Honda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/025,733

(22) Filed: Feb. 18, 1998

(30) Foreign Application Priority Data

Feb. 20, 1997 (JP) .................................................. 9-051096

(51) Int. Cl.⁷ ........................................................ H04Q 7/20
(52) U.S. Cl. .......................................... 455/456; 455/67.1
(58) Field of Search .................................... 455/423, 424, 455/425, 456, 67.1, 67.4

(56) References Cited

U.S. PATENT DOCUMENTS

| 4,169,245 | * | 9/1979 | Crom | 325/58 |
|---|---|---|---|---|
| 5,293,642 | * | 3/1994 | Lo | 455/33.1 |
| 5,327,144 | * | 7/1994 | Stilp | 342/387 |
| 5,381,445 | * | 1/1995 | Hershey | 375/1 |
| 5,548,583 | * | 8/1996 | Bustamante | 370/18 |
| 5,600,706 | * | 2/1997 | Dunn | 379/59 |
| 5,675,344 | * | 10/1997 | Tong | 342/457 |
| 5,687,196 | * | 11/1997 | Proctor | 375/347 |
| 5,890,068 | * | 3/1999 | Fattouche | 455/456 |
| 5,970,413 | * | 10/1999 | Gilhousen | 455/456 |

FOREIGN PATENT DOCUMENTS

| 0242115 | 10/1987 | (EP) . | | |
|---|---|---|---|---|
| 1435174 | 5/1976 | (GB) . | | |
| 1486319 | 9/1977 | (GB) . | | |
| 2153177 | 8/1985 | (GB) . | | |
| 2265063 | 9/1993 | (GB) . | | |
| 7038951 | 2/1995 | (JP) | ................................ | H04Q/7/34 |
| 07307686 | * 11/1995 | (JP) | .............................. | H04B/1/707 |
| 8179028 | 7/1996 | (JP) | .................................. | G01S/5/14 |
| WO 93/23765 | 11/1993 | (WO) . | | |

* cited by examiner

Primary Examiner—Daniel Hunter
Assistant Examiner—Nick Corsaro
(74) Attorney, Agent, or Firm—Connolly Bove Lodge & Hutz

(57) ABSTRACT

A first station can communicate with a second station by radio. The second station has a function of repeating a received radio signal. A radio communication apparatus in the first station includes a first device for transmitting a first radio-frequency signal containing a predetermined pseudo-noise code signal toward the second station. In the radio communication apparatus, detection is made as to a first timing at which the first device transmits the first radio-frequency signal. A second radio-frequency signal is received by the radio communication apparatus after the first device transmits the first radio-frequency signal. The second radio-frequency signal is converted into a baseband signal. A memory stores the predetermined pseudo-noise code signal. Calculation is made as to a correlation between the baseband signal and the predetermined pseudo-noise code signal stored in the memory. A second timing at which the calculated correlation peaks substantially is detected. The time interval between the first timing and the second timing is calculated. The distance between the first station and the second station is calculated on the basis of the calculated time interval.

6 Claims, 5 Drawing Sheets

MOBILE COMMUNICATION APPARATUS WITH DISTANCE MEASURING UNIT

BACKGROUND OF THE INVENTION

1. Field of the Invention

This invention generally relates to a radio communication apparatus having a unit for measuring the distance between two stations. This invention particularly relates to a mobile radio communication apparatus having a unit for measuring the distance between a mobile station and a base station. This invention also relates to a mobile radio communication apparatus having a unit for detecting the timing of the reception of a reference signal transmitted from a base station.

2. Description of the Related Art

Japanese published unexamined patent application 7-38951 discloses a method of detecting the position of a portable station (a mobile station) relative to the positions of base stations. According to the method in Japanese application 7-38951, a position detection inquiry signal is transmitted from one of the base stations to a portable station at a predetermined time period. The portable station sends a position detection answer signal when receiving the position detection inquiry signal. The position detection answer signal contains identification information related to the portable station. The position detection answer signal is received by at least three base stations close to the portable station. In each of the three base stations, the electric field strength of the received position detection answer signal is measured, and the distance between the portable station and the base station is calculated on the basis of the measured electric field strength. The position of the portable station relative to the positions of the base stations is estimated from the calculated distances between the portable station and the three base stations.

In Japanese application 7-38951, the distance between the portable station and the base station is calculated on the basis of the electric field strength of the portable-station signal received at the base station. Since the electric field strength of the portable-station signal received at the base station depends on not only the distance between the portable station and the base station but also other factors. Generally, some of the other factors significantly affect the electric field strength of the received signal. Accordingly, in Japanese application 7-38951, the calculated distance between the portable station and the base station tends to be inaccurate in certain conditions.

Japanese published unexamined patent application 8-179028 relates to detection of the present position of a mobile station in a cellular telephone network. In Japanese application 8-179028, a mobile station has a function of measuring the levels of received radio signals transmitted from at least three adjacent base stations including a traffic base station. When the mobile station requests information of its present position, the traffic base station instructs the mobile station to report the measured signal levels. The traffic base station calculates the losses of propagation of radio wave between the mobile station and the base stations on the basis of the measured signal levels reported by the mobile station. Then, the traffic base station calculates the distances between the mobile station and the base stations on the basis of the calculated propagation losses. The present position of the mobile station is estimated from the calculated distances between the mobile station and the base stations.

In Japanese application 8-179028, the distance between the mobile station and the base station is calculated on the basis of the level of the base-station signal received at the mobile station. The level of the base-station signal received at the mobile station depends on not only the distance between the mobile station and the base station but also other factors. Generally, some of the other factors significantly affect the level of the received signal. Accordingly, in Japanese application 8-179028, the calculated distance between the mobile station and the base station tends to be inaccurate in certain conditions.

SUMMARY OF THE INVENTION

It is a first object of this invention to provide a radio communication apparatus having an improved unit for measuring the distance between two stations.

It is a second object of this invention to provide a mobile radio communication apparatus having an improved unit for measuring the distance between a mobile station and a base station.

It is a third object of this invention to provide an improved mobile radio communication apparatus having a unit for detecting the timing of the reception of a reference signal transmitted from a base station.

A first aspect of this invention provides a radio communication apparatus comprising first means for receiving a radio-frequency signal; second means for converting the radio-frequency signal received by the first means into a corresponding baseband signal; a memory storing a predetermined pseudo-noise code signal; third means for calculating a correlation between the baseband signal generated by the second means and the predetermined pseudo-noise code signal stored in the memory; and fourth means for detecting a timing at which the correlation calculated by the third means peaks substantially.

A second aspect of this invention is based on the first aspect thereof, and provides a radio communication apparatus wherein the fourth means comprises first sub-means for differentiating the calculated correlation into a differentiation result; second sub-means for deciding whether or not the differentiation result generated by the first sub-means becomes smaller than a predetermined reference value; and third sub-means for using a timing at which the second sub-means decides that the differentiation result becomes smaller than the predetermined reference value as the timing at which the calculated correlation peaks substantially.

A third aspect of this invention provides a radio communication apparatus in a first station which can communicate with a second station by radio, the second station having a function of repeating a received radio signal, the apparatus comprising first means for transmitting a first radio-frequency signal containing a predetermined pseudo-noise code signal toward the second station; second means for detecting a first timing at which the first means transmits the first radio-frequency signal; third means for receiving a second radio-frequency signal after the first means transmits the first radio-frequency signal; fourth means for converting the second radio-frequency signal received by the third means into a baseband signal; a memory storing the predetermined pseudo-noise code signal; fifth means for calculating a correlation between the baseband signal generated by the fourth means and the predetermined pseudo-noise code signal stored in the memory; sixth means for detecting a second timing at which the correlation calculated by the fifth means peaks substantially; seventh means for calculating a time interval between the first timing detected by the second means and the second timing detected by the sixth means; and eighth means for calculating a distance between the first station and the second station on the basis of the time interval calculated by the seventh means.

A fourth aspect of this invention is based on the third aspect thereof, and provides a radio communication apparatus wherein the sixth means comprises first sub-means for differentiating the calculated correlation into a differentiation result; second sub-means for deciding whether or not the differentiation result generated by the first sub-means becomes smaller than a predetermined reference value; and third sub-means for using a timing at which the second sub-means decides that the differentiation result becomes smaller than the predetermined reference value as the second timing at which the calculated correlation peaks substantially.

DESCRIPTION OF THE PREFERRED EMBODIMENTS

First Embodiment

A first embodiment of this invention relates to a mobile radio communication apparatus having a unit for detecting the timing of the reception of a reference signal transmitted from a base station.

Figure 1:
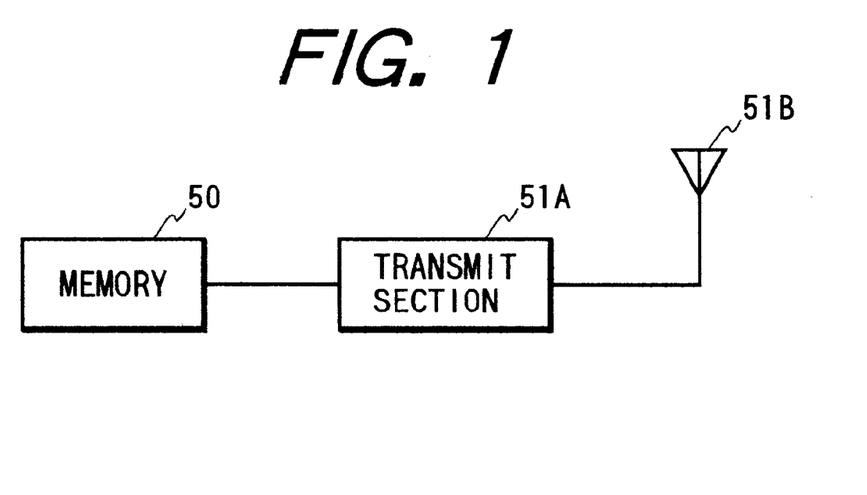
FIG. 1 is a block diagram of a portion of a radio communication apparatus in a base station according to a first embodiment of this invention.

With reference to FIG. 1, a portion of a base station includes a memory 50, a transmitting section 51A, and an antenna 51B. The memory 50 is connected to the transmitting section 51A. The transmitting section 51A is connected to the antenna 51B.

A predetermined reference signal is stored in the memory 50. The reference signal includes a predetermined pseudonoise code signal (a predetermined PN code signal) having a given number of bits. The bits of the predetermined PN code signal are successively read out from the memory 50 in response to a read clock signal having a predetermined period corresponding to a 1-sample interval. Thus, the serial-form predetermined PN code signal is outputted from the memory 50. The read clock signal used by the memory 50 has a predetermined frequency equal to, for example, 3 MHz. It is preferable that the serial-form predetermined PN code signal is periodically outputted from the memory 50 at a predetermined timing.

The transmitting section 51A receives the serial-form predetermined PN code signal from the memory 50 as a baseband signal to be transmitted. The transmitting section 51A converts the serial-form predetermined PN code signal into a corresponding radio-frequency signal. The transmitting section 51A feeds the radio-frequency signal to the antenna 51B. The radio-frequency signal is radiated by the antenna 51B.

In this way, the base station transmits the radio-frequency signal which contains the serial-form predetermined PN code signal.

Figure 2:
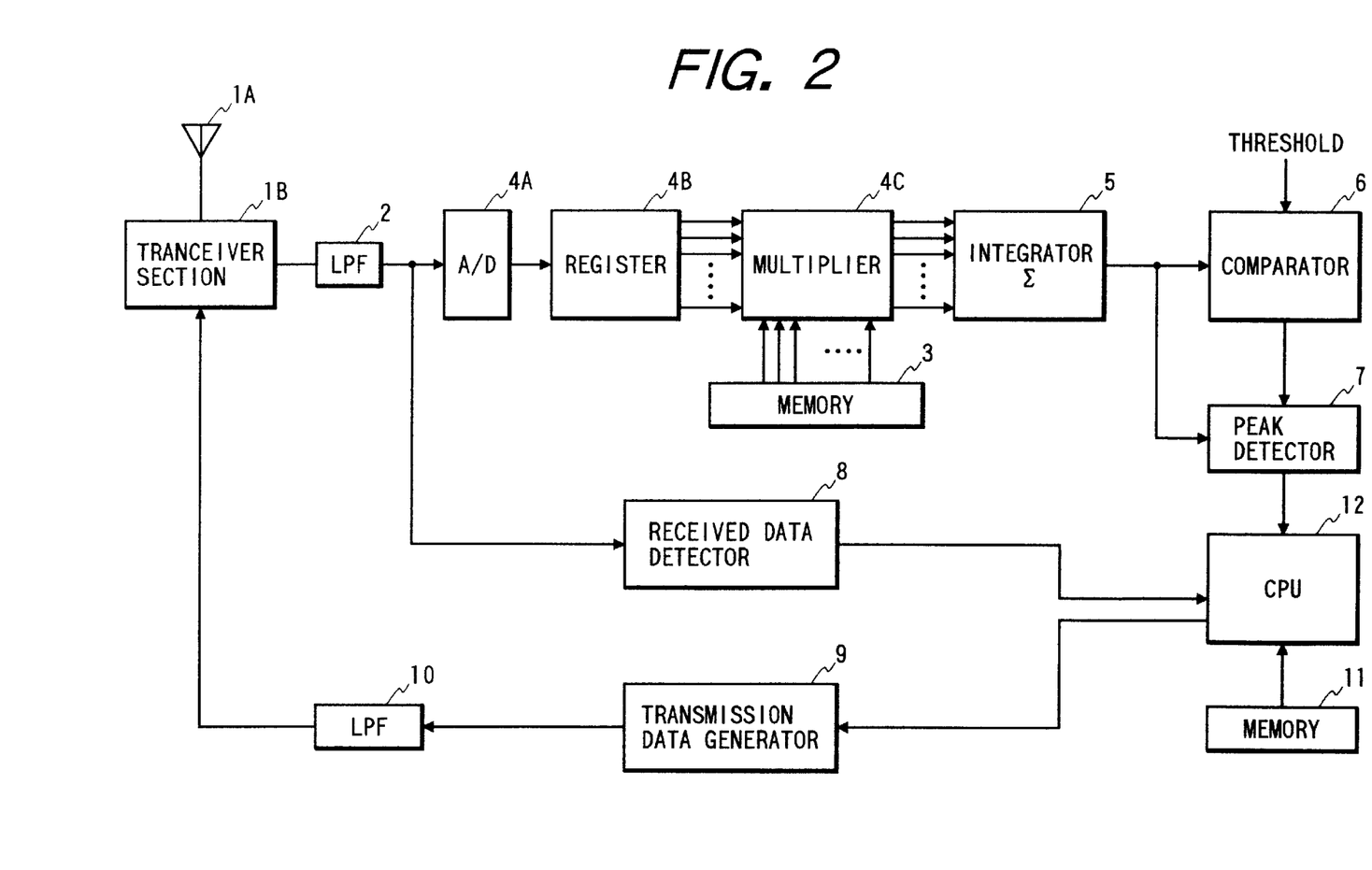
FIG. 2 is a block diagram of a radio communication apparatus in a mobile station according to the first embodiment of this invention.

With reference to FIG. 2, a mobile station includes an antenna 1A, a transceiver section 1B, a low pass filter (an LPF) 2, a memory 3, an analog-to-digital converter (an A/D converter) 4A, a register 4B, a multiplier 4C, an integrator 5, a comparator 6, a peak detector 7, a received data detector 8, a transmission data generator 9, a low pass filter (an LPF) 10, a memory 11, and a CPU 12.

The antenna 1A is connected to the transceiver section 1B. The transceiver section 1B is connected to the low pass filter 2. The low pass filter 2 is followed by the A/D converter 4A and the received data detector 8. The A/D converter 4A is followed by the register 4B. The register 4B is connected to the multiplier 4C. Also, the memory 3 is connected to the multiplier 4C. The multiplier 4C is connected to the integrator 5. The integrator 5 is connected to the comparator 6 and the peak detector 7. The comparator 6 is connected to the peak detector 7. The peak detector 7 is connected to the CPU 12. The received data detector 8, the memory 11, and the transmission data generator 9 are connected to the CPU 12. The transmission data generator 9 is followed by the low pass filter 10. The low pass filter 10 is followed by the transceiver section 1B.

A radio-frequency signal transmitted from a base station (for example, the base station in FIG. 1) is caught by the antenna 1A. In general, the radio-frequency signal contains transmitted data. The transmitted data has a predetermined period determined by a data clock signal with a frequency of, for example, 10 KHz. As previously mentioned, the radio-frequency signal transmitted from the base station in FIG. 1 contains the serial-form predetermined PN code signal. The radio-frequency signal is fed from the antenna 1A to the transceiver section 1B. The transceiver section 1B converts the radio-frequency signal into a corresponding baseband signal. The transceiver section 1B outputs the baseband signal to the low pass filter 2. The baseband signal is processed by the low pass filter 2. The resultant output signal of the low pass filter 2 is fed to the A/D converter 4A and the received data detector 8.

The A/D converter 4A periodically samples the output signal of the low pass filter 2 in response to a clock signal having a predetermined period corresponding to a 1-sample interval. Thus, the A/D converter 4A periodically generates an analog sample of the output signal of the low pass filter 2. The A/D converter 4A changes every analog sample into a corresponding digital sample. The A/D converter 4A outputs every digital sample to the register 4B. The clock signal used by the A/D converter 4A has a predetermined frequency equal to, for example, 3 MHz. The register 4B is of, for example, the shift type. Every digital sample outputted from the A/D converter 4A is written into the register 4B. A given number of successive digital samples are stored in the register 4B. The given number of samples in the register 4B is equal to the number of the bits of the predetermined PN code signal. Successive digital samples in the register 4B are handled as corresponding to the bits of the predetermined PN code signal, respectively. The successive digital samples are fed from the register 4B to the multiplier 4C in parallel. In other words, the successive digital samples are fed from the register 4B to the multiplier 4C as a parallel-form digital signal.

The memory 3 stores the predetermined PN code signal. The bits of the predetermined PN code signal are continuously fed from the memory 3 to the multiplier 4C in parallel. Thus, the parallel-form predetermined PN code signal is continuously fed from the memory 3 to the multiplier 4C.

The multiplier 4C has a given number of sections which is equal to the number of the bits of the predetermined PN code signal. The sections of the multiplier 4C receive the respective digital samples from the register 4B. Also, the sections of the multiplier 4C receive the respective bits of the predetermined PN code signal from the memory 3. Each of the sections of the multiplier 4C multiplies the corresponding digital sample and the corresponding bit of the predetermined PN code signal, and outputs a signal to the integrator 5 which represents the multiplication result. The integrator 5 includes, for example, a summing device. The integrator 5 adds the output signals from the respective sections of the multiplier 4C. The integrator 5 outputs the addition-resultant signal to the comparator 6 and the peak detector 7.

The multiplier 4C and the integrator 5 compose a correlator which calculates the value of the correlation between the parallel-form digital signal outputted from the register 4B and the parallel-form predetermined PN code signal outputted from the memory 3. Accordingly, the output signal of the integrator 5 represents the calculated correlation value.

The comparator 6 receives a signal from a memory (not shown) which represents a threshold value. Also, the comparator 6 receives the output signal of the integrator 5 which represents the calculated correlation value. The device 6 compares the calculated correlation value with the threshold value. The comparator 6 outputs a high-level signal to the peak detector 7 when the calculated correlation value is greater than the threshold value. The comparator 6 outputs a low-level signal to the peak detector 7 when the calculated correlation value is equal to or smaller than the threshold value.

The peak detector 7 is activated or enabled when the output signal of the comparator 6 changes from a low level to a high level, that is, when the calculated correlation value exceeds the threshold value. The peak detector 7 receives the output signal of the integrator 5 which represents the calculated correlation value. The device 7 detects a moment at which the calculated correlation value peaks substantially. This moment is referred to as the peak-occurrence moment. The peak detector 7 outputs a signal to the CPU 12 which represents the detected peak-occurrence moment. For example, the output signal of the peak detector 7 changes from a low level to a high level at a timing equal to the detected peak-occurrence moment. Immediately after the peak-occurrence moment is detected, the peak detector 7 becomes inactive or disabled.

The received data detector 8 recovers transmitted data from the output signal of the low pass filter 2. The received data detector 8 outputs the recovered data to the CPU 12.

The memory 11 stores communication control data and delay-time data. The CPU 12 reads out the communication control data and the delay-time data from the memory 11. The CPU 12 receives voice-representing data from a suitable device (not shown). The CPU 12 outputs the communication control data, the delay-time data, and the voice-representing data to the transmission data generator 9. The transmission data generator 9 converts the communication control data, the delay-time data, and the voice-representing data into a corresponding baseband signal of a given format suited to the processing by the transceiver section 1B. The transmission data generator 9 outputs the baseband signal to the low pass filter 10. The baseband signal is processed by the low pass filter 10. The resultant output signal of the low pass filter 10 is fed to the transceiver section 1B. The transceiver section 1B converts the output signal of the low pass filter 10 into a corresponding radio-frequency signal. The transceiver section 1B feeds the radio-frequency signal to the antenna 1A. The radio-frequency signal is radiated by the antenna 1A before being propagated to the base station.

Figure 3:
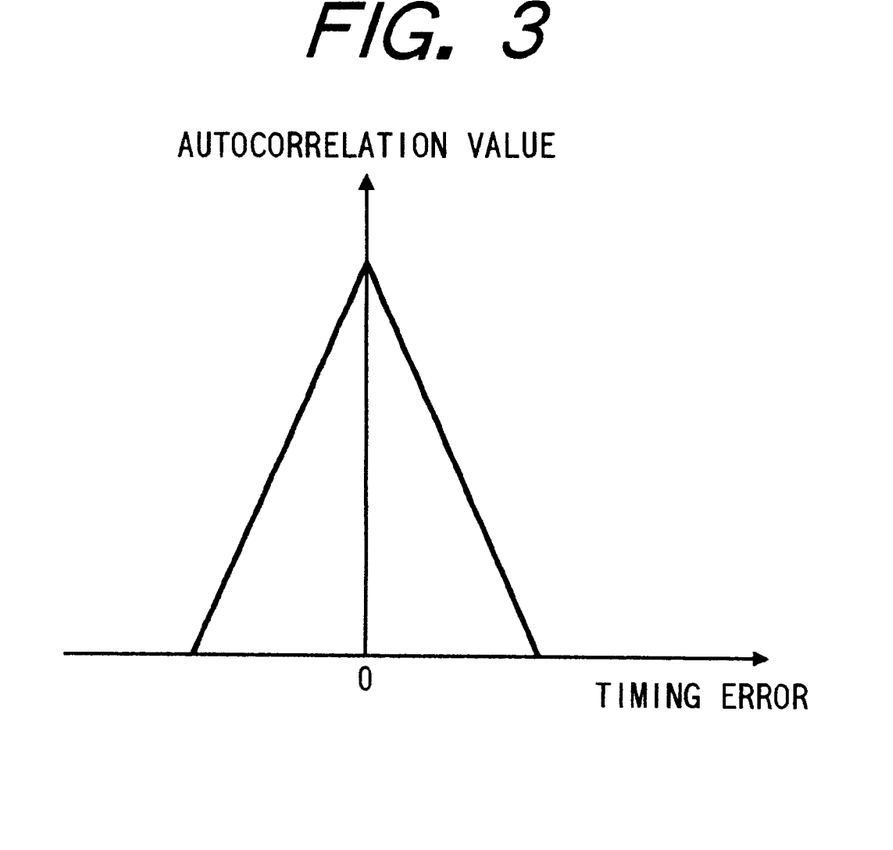
FIG. 3 is a diagram of the relation between an autocorrelation value and a timing error.

With reference to FIG. 3, the value of the correlation (the autocorrelation) between first and second PN code signals which are equal in contents varies in accordance with the timing error between the first and second PN code signals. Specifically, the correlation value linearly increases as the timing error moves toward "0" in a negative side. The correlation value peaks at a timing error of "0". The correlation value linearly increases as the timing error moves away from "0" in a positive side.

As previously mentioned, the radio-frequency signal transmitted from the base station in FIG. 1 contains the serial-form predetermined PN code signal. Thus, in the case where such a radio-frequency signal is caught by the antenna 1A, the predetermined PN code signal appears as the output signal of the register 4B at a certain timing. In this case, the calculated correlation value represented by the output signal of the integrator 5 varies in time domain along an inverted-V shape similar to the shape in FIG. 3. The calculated correlation value peaks when the output signal of the register 4B which corresponds to the predetermined PN code signal becomes equal in timing with the predetermined PN code signal outputted from the memory 3. The timing (the peak-occurrence moment) at which the calculated correlation value peaks substantially is detected by the peak detector 7. The peak detector 7 informs the CPU 12 of the detected peak-occurrence moment.

It is preferable that the memory 11 also stores the predetermined PN code signal, and the delay-time data stored in the memory 11 represents signal delay times caused in the signal processings by the devices in the mobile station such as the transceiver section 1B and the low pass filters 2 and 10. The signal delay times are measured in advance.

The CPU 12 operates in accordance with a program stored in its internal ROM. Preferably, the program is designed so that the CPU 12 transfers the predetermined PN code signal from the memory 11 to the transmission data generator 9 immediately after being informed of the detected peak-occurrence moment by the peak detector 7. In this case, the transmission data generator 9 converts the predetermined PN code signal into a corresponding baseband signal, and feeds the baseband signal to the transceiver section 1B via the low pass filter 10. The tranceiver section 1B converts the baseband signal into a corresponding radio-frequency signal. The tranceiver section 1B feeds the radio-frequency signal to the antenna 1A. The radio-frequency signal is radiated by the antenna 1A before being propagated to the base station. Thus, it is preferable that the predetermined PN code signal is transmitted toward the base station by radio immediately after the peak-occurrence moment is detected.

It should be noted that the CPU 12 may transfer the predetermined PN code signal from the memory 3 to the transmission data generator 9. In this case, the CPU 12 and the memory 3 are connected.

It is preferable that after the transmission of the predetermined PN code signal toward the base station, the CPU 12 transfers the communication control data and the delay-time data from the memory 11 to the transmission data generator 9, and also feeds the voice-representing data to the transmission data generator 9. In this case, the communication control data, the delay-time data, and the voice-representing data are transmitted toward the base station by radio after the transmission of the predetermined PN code signal.

Figure 4:
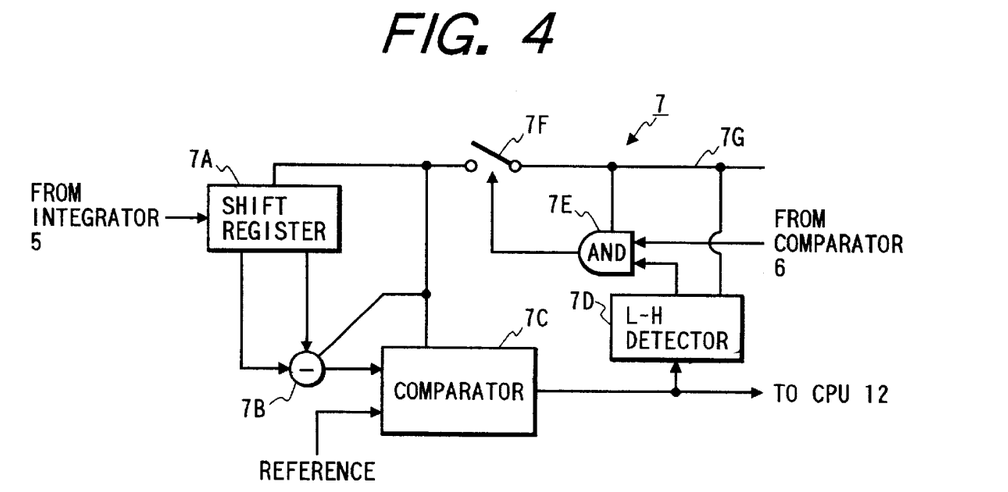
FIG. 4 is a block diagram of a peak detector in FIG. 2.

As shown in FIG. 4, the peak detector 7 includes a shift register 7A, a subtracter 7B, a comparator 7C, a change detector 7D, an AND gate 7E, and a switch 7F. A power supply line 7G subjected to a power supply voltage is connected via the switch 7F to the power supply terminals of the shift register 7A, the subtracter 7B, and the comparator 7C. The shift register 7A, the subtracter 7B, and the comparator 7C are activated when the switch 7F is closed. The shift register 7A, the subtracter 7B, and the comparator 7C are deactivated when the switch 7F is opened. The power supply line 7G is directly connected to the power supply terminals of the change detector 7D and the AND gate 7E. Accordingly, the change detector 7D and the AND gate 7E are continuously activated regardless of the position of the switch 7F.

The input terminal of the shift register 7A is connected to the integrator 5. Two output terminals of the shift register 7A are connected to two input terminals of the subtracter 7B, respectively.

The output terminal of the subtracter 7B is connected to a first input terminal of the comparator 7C. A second input terminal of the comparator 7C receives a signal from a memory (not shown) which represents a predetermined reference value close to "0". The output terminal of the comparator 7C is connected to the CPU 12 and the input terminal of the change detector 7D. The output terminal of the change detector 7D is connected to a first input terminal of the AND gate 7E. A second input terminal of the AND gate 7E receives the output signal of the comparator 6. The output terminal of the AND gate 7E is connected to the control terminal of the switch 7F.

Normally, the change detector 7D outputs a high-level signal to the AND gate 7E. Therefore, the AND gate 7E is normally open. As previously mentioned, the comparator 6 outputs a high-level signal when the calculated correlation value represented by the output signal of the integrator 5 exceeds the threshold value. The high-level signal outputted from the comparator 7 travels to the control terminal of the switch 7F through the AND gate 7E. The switch 7F is closed by the high-level signal from the comparator 7. The shift register 7A, the subtracter 7B, and the comparator 7C are activated when the switch 7F is closed. In this case, the peak detector 7 operates as follows.

Every 1-sample-corresponding time segment of the output signal of the integrator 5 is written into the shift register 7A. Two successive samples are stored in the shift register 7A. The two successive samples are simultaneously fed from the shift register 7A to the subtracter 7B. The device 7B subtracts the value represented by the previous sample from the value represented by the latest sample. The subtracter 7B outputs a signal to the comparator 7C which represents the subtraction result "dp". The shift register 7A and the subtracter 7B compose a differentiator operating on the output signal of the integrator 5.

Figure 5:
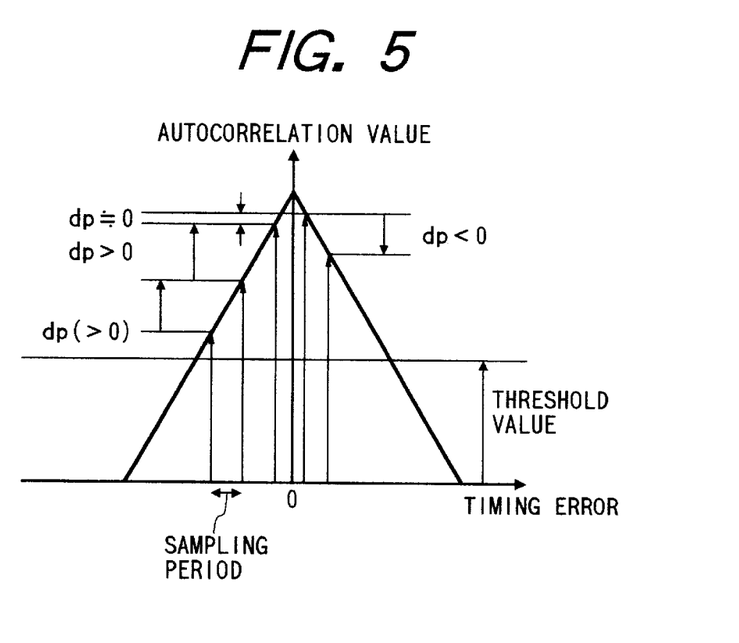
FIG. 5 is a diagram of the relation between an autocorrelation value and a timing error.

As shown in FIG. 5, the subtraction result "dp" is positive and is significantly greater than "0" until the calculated correlation value (the calculated autocorrelation value) peaks. The subtraction result "dp" becomes approximately equal to "0" when the calculated correlation value peaks. The subtraction result "dp" is negative and is significantly smaller than "0" after the calculated correlation value peaks.

The device 7C compares the subtraction result "dp" with the predetermined reference value which is close to "0". When the subtraction result "dp" is greater than the predetermined reference value, the comparator 7C outputs a low-level signal. When the subtraction result "dp" is equal to or smaller than the predetermined reference value, the comparator 7C outputs a high-level signal. Generally, the output signal of the comparator 7C is in the low-level state until the calculated correlation value peaks. In addition, the output signal of the comparator 7C changes from the low-level state to the high-level state when the calculated correlation value peaks. The low-to-high change in the output signal of the comparator 7C is fed to the CPU 12 as an indication of the detection of the peak-occurrence moment.

The low-to-high change in the output signal of the comparator 7C is also fed to the change detector 7D. The change detector 7D outputs a low-level signal to the AND gate 7E in response to the low-to-high change in the output signal of the comparator 7C. The AND gate 7E is closed by the low-level output signal from the change detector 7D. When the AND gate 7E is closed, the signal applied to the control terminal of the switch 7F falls into the low-level state so that the switch 7F is opened. As a result, the shift register 7A, the subtracter 7B, and the comparator 7C are deactivated. In this way, the shift register 7A, the subtracter 7B, and the comparator 7C are deactivated immediately after the peak-occurrence moment is detected. The output signal of the change detector 7D remains in the low-level state for a predetermined length of time, and then returns to the high-level state. The change detector 7D includes, for example, a monostable multivibrator.

Second Embodiment

A second embodiment of this invention relates to a mobile radio communication apparatus having a unit for measuring the distance between a mobile station and a base station. The second embodiment of this invention is similar to the first embodiment thereof except for design changes explained hereinafter. The second embodiment of this invention uses a predetermined PN code signal as a distance-measuring reference signal (distance-measuring data).

Figure 6:
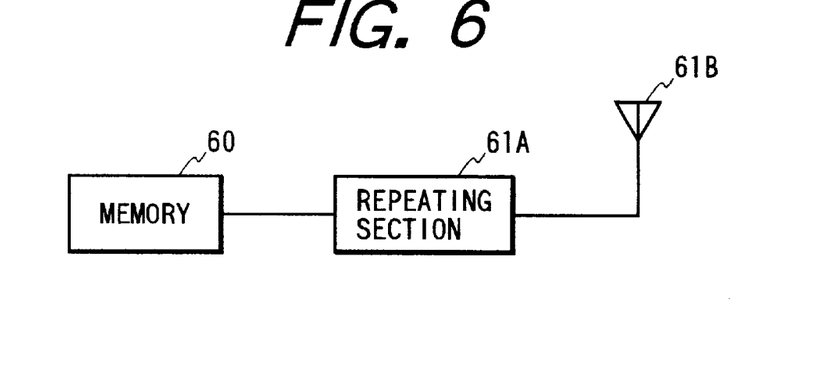
FIG. 6 is a block diagram of a portion of a radio communication apparatus in a base station according to a second embodiment of this invention.

With reference to FIG. 6, a portion of a base station includes a memory 60, a repeating section 61A, and an antenna 61B. The memory 60 is connected to the repeating section 61A. The repeating section 61A is connected to the antenna 61B.

The antenna 61B catches a radio-frequency signal which is transmitted from a mobile station. The radio-frequency signal contains a predetermined PN code signal used as a distance-measuring reference signal (distance-measuring data). The radio-frequency signal is fed from the antenna 61B to the repeating section 61A. The repeating section 61A returns the radio-frequency signal to the antenna 61B a given-time after the reception of the radio-frequency signal. The radio-frequency signal is radiated by the antenna 61B, being returned to the mobile station. In this way, the base station repeats the radio-frequency signal containing the predetermined PN code signal which is transmitted from the mobile station.

Delay-time data is stored in the memory 60. The delay-time data in the memory 60 represents a length of time by which the base station delays a radio-frequency signal containing the predetermined PN code signal in the repeating process. This time length is equal to the time interval between the moment of the reception of the radio-frequency signal by the base station and the moment of the transmission of the same radio-frequency signal by the base station. This time length (the signal delay time) is measured in advance.

The repeating section 61A reads out the delay-time data from the memory 60. The repeating section 61A converts the delay-time data into a corresponding radio-frequency signal. The repeating section 61A feeds the radio-frequency signal to the antenna 61B. The radio-frequency signal is radiated by the antenna 61B. In this way, the base station transmits the radio-frequency signal which contains the delay-time data.

Figure 7:
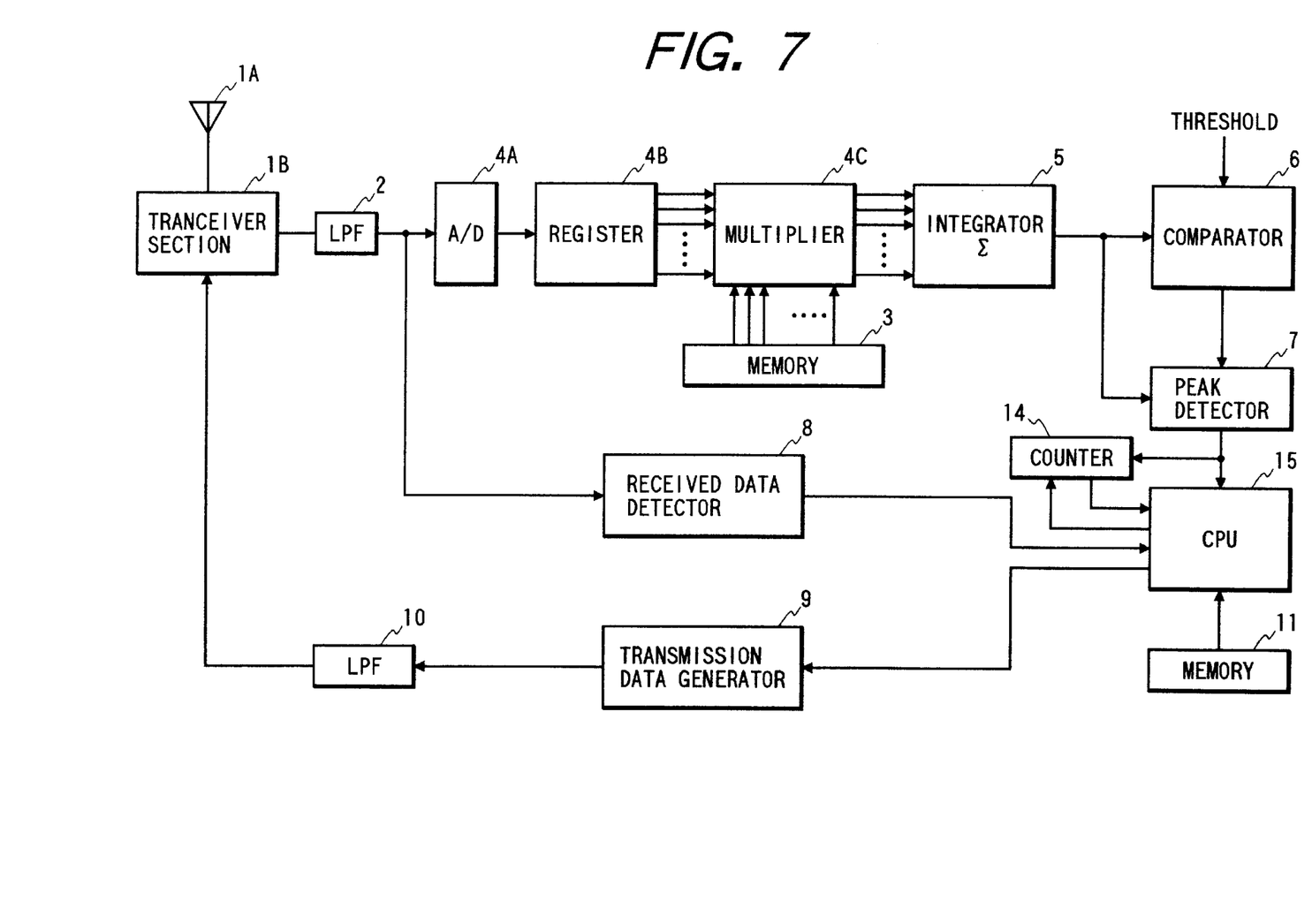
FIG. 7 is a block diagram of a radio communication apparatus in a mobile station according to the second embodiment of this invention.

With reference to FIG. 7, a mobile station includes a CPU 15 instead of the CPU 12 in FIG. 2. The mobile station of FIG. 7 includes a counter 14 connected to the peak detector 7 and the CPU 15. The counter 14 operates to count pulses of a high-frequency clock signal fed from a suitable device (not shown).

The radio-frequency signal containing the delay-time data which is transmitted from the base station is caught by the antenna 1A. The radio-frequency signal is fed from the antenna 1A to the transceiver section 1B. The transceiver section 1B converts the radio-frequency signal into a corresponding baseband signal. The tranceiver section 1B outputs the baseband signal to the low pass filter 2. The baseband signal is processed by the low pass filter 2. The resultant output signal of the low pass filter 2 is fed to the received data detector 8. The received data detector 8 recovers the delay-time data from the output signal of the low pass filter 2. The received data detector 8 outputs the recovered delay-time data to the CPU 15. The recovered delay-time data (the base-station delay-time data) is stored in a RAM within the CPU 15.

The CPU 15 operates in accordance with a program stored in its internal ROM. The program is designed to implement the following processes. The CPU 15 transfers the predetermined PN code signal (the distance-measuring reference signal) from the memory 11 to the transmission data generator 9. At substantially the same time, the CPU 15 resets the counter 14 and starts the device 14 counting pulses of the high-frequency clock signal. The transmission data generator 9 converts the predetermined PN code signal into a corresponding baseband signal, and feeds the baseband signal to the transceiver section 1B via the low pass filter 10. The tranceiver section 1B converts the baseband signal into a corresponding radio-frequency signal. The tranceiver section 1B feeds the radio-frequency signal to the antenna 1A. The radio-frequency signal is radiated by the antenna 1A before being propagated to the base station. The moment of the radiation of the radio-frequency signal containing the predetermined PN code signal is substantially the same time as the moment of the start of operation of the counter 14. In other words, the moment of the transmission of the predetermined PN code signal (the distance-measuring reference signal) from the mobile station is substantially the same as the moment of the start of operation of the counter 14.

It should be noted that the CPU 15 may transfer the predetermined PN code signal from the memory 3 to the transmission data generator 9. In this case, the CPU 15 and the memory 3 are connected.

As previously mentioned, the radio-frequency signal containing the predetermined PN code signal which is transmitted from the mobile station is repeated by the base station. Thus, the radio-frequency signal containing the predetermined PN code signal is returned to the mobile station. The radio-frequency signal returned from the base station is caught by the antenna 1A. The radio-frequency signal is fed from the antenna 1A to the transceiver section 1B. The transceiver section 1B converts the radio-frequency signal into a corresponding baseband signal containing the predetermined PN code signal. The tranceiver section 1B outputs the baseband signal to the low pass filter 2. The baseband signal is processed by the low pass filter 2. The resultant output signal of the low pass filter 2 is fed to the A/D converter 4A. Since the output signal of the low pass filter 2 contains the predetermined PN code signal, the calculated correlation value represented by the output signal of the integrator 5 peaks at a certain timing. The peak detector 7 detects the timing (the peak-occurrence moment) at which the calculated correlation value peaks substantially. The peak detector 7 informs the CPU 15 of the detected peak-occurrence moment.

The output signal of the peak detector 7 is applied to the counter 14 in addition to the CPU 15. For example, the output signal of the peak detector 7 changes from a low level to a high level at a timing equal to the detected peak-occurrence moment. The low-to-high change in the output signal of the peak detector 7 stops the counter 14 from counting pulses of the high-frequency clock signal. Thus, operation of the counter 14 is stopped at substantially the same time as the moment of the reception of the predetermined PN code signal (the distance-measuring reference signal) by the mobile station. In this way, the counter 14 continues to count pulses of the high-frequency clock signal only during the time interval between the moment of the transmission of the predetermined PN code signal and the moment of the reception of the predetermined PN code signal. Accordingly, until the counter 14 is reset next, the final output signal of the counter 14, that is, the total number of pulses counted by the counter 14, represents the time interval between the moment of the transmission of the predetermined PN code signal and the moment of the reception of the predetermined PN code signal. The output signal of the counter 14 is fed to the CPU 15. Thus, the counter 14 informs the CPU 15 of the above-mentioned time interval.

The time interval between the moment of the transmission of the predetermined PN code signal and the moment of the reception of the predetermined PN code signal contains a first sub-time interval during which the radio-frequency signal containing the predetermined PN code signal is propagated from the mobile station to the base station, and a second sub-time interval during which the radio-frequency signal containing the predetermined PN code signal is propagated from the base station to the mobile station. The propagation velocity of the radio-frequency signal is equal to a known constant value. Therefore, the time interval between the moment of the transmission of the predetermined PN code signal and the moment of the reception of the predetermined PN code signal increases as the distance between the mobile station and the base station increases. Thus, the above-mentioned time interval indicates the distance between the mobile station and the base station.

After the CPU 15 is informed by the peak detector 7 that the peak-occurrence moment is detected, the CPU 15 reads out the delay-time data (the mobile-station delay-time data) from the memory 11. The mobile-station delay-time data represents the signal delay times caused in the signal processings by the devices in the mobile station such as the transceiver section 1B and the low pass filters 2 and 10. The CPU 15 derives the information of the time interval from the output signal of the counter 14. According to a predetermined equation, the CPU 15 calculates the distance between the mobile station and the base station from the time interval, the signal delay times represented by the mobile-station delay-time data, and the signal delay time represented by the base-station delay-time data. It should be noted that the base-station delay-time data is transmitted from the base station, and is stored in the RAM within the CPU 15.

Figure 8:
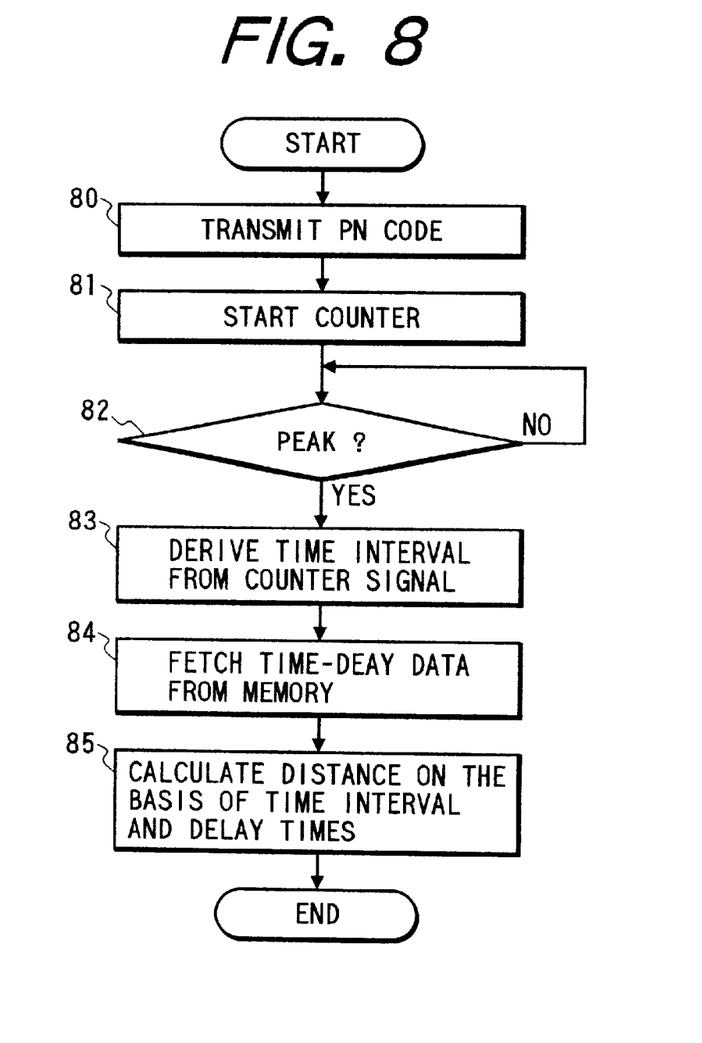
FIG. 8 is a flowchart of a segment of a program for a CPU in FIG. 7.

As previously mentioned, the CPU 15 operates in accordance with a program stored in its internal ROM. FIG. 8 is a flowchart of a segment of the program which relates to the distance calculation.

With reference to FIG. 8, a first step 80 of the program segment transfers the predetermined PN code signal from the memory 11 to the transmission data generator 9. Therefore, the radio-frequency signal containing the predetermined PN code signal (the distance-measuring reference signal) is transmitted from the mobile station.

A step 81 following the step 80 starts the counter 14 counting pulses of the high-frequency clock signal. After the step 81, the program advances to a step 82.

The step 82 decides whether or not a peak-occurrence moment is detected by referring to the output signal of the peak detector 7. When a peak-occurrence moment is not detected, the step 82 is repeated. When a peak-occurrence moment is detected, the program advances from the step 82 to a step 83.

The step 83 derives information of a time interval from the output signal of the counter 14.

A step 84 following the step 83 fetches the mobile-station delay-time data from the memory 11.

A step 85 subsequent to the step 84 calculates the distance between the mobile station and the base station from the time interval derived in the step 83, the signal delay times represented by the mobile-station delay-time data, and the signal delay time represented by the base-station delay-time data. The calculation of the distance is implemented according to the predetermined equation. It should be noted that the base-station delay-time data is stored in the RAM within the CPU 15.

After the step 85, the current execution cycle of the program segment ends.

The mobile station may transmit a notice signal to the base station which asks permission to transmit the radio-frequency signal containing the predetermined PN code signal (the distance-measuring reference signal). The base station returns a positive or negative answer signal in response to the notice signal. When a positive answer signal is returned from the base station, the mobile station executes the transmission of the radio-frequency signal containing the predetermined PN code signal. When a negative answer signal is returned from the base station or a positive answer signal is not returned from the base station, the mobile station abandons the transmission of the radio-frequency signal containing the predetermined PN code signal. In this design, the predetermined PN code signal can be small in code length.

What is claimed is:

1. A radio communication apparatus in a mobile station which can communicate with a base station by radio, the base station having a function of repeating a received radio signal, the apparatus comprising:

first means for transmitting a first radio-frequency signal containing a predetermined pseudo-noise code signal toward the base station;

second means for detecting a first timing at which the first means transmits the first radio-frequency signal;

third means for receiving a second radio-frequency signal after the first means transmits the first radio-frequency signal;

fourth means for converting the second radio-frequency signal received by the third means into a baseband signal;

a memory storing the predetermined pseudo-noise code signal;

fifth means for calculating a correlation between the baseband signal generated by the fourth means and the predetermined pseudo-noise code signal stored in the memory;

sixth means for detecting a second timing at which the correlation calculated by the fifth means peaks substantially, said sixth means comprising:

first sub-means for differentiating the calculated correlation into a differentiation result;

a second sub-means for deciding whether or not the differentiation result generated by the first sub-means becomes smaller than a predetermined reference value; and third sub-means for using a timing at which the second sub-means decides that the differentiation result becomes smaller than the predetermined reference value as the second timing at which the calculated correlation peaks substantially;

seventh means for calculating a time interval between the first timing detected by the second means and the second timing detected by the sixth means; and eighth means for calculating a distance between the mobile station and the base station on the basis of the time interval calculated by the seventh means.

2. A radio communication system comprising:

a base station and a mobile station which can communicate with each other by radio;

first means provided in the mobile station for transmitting a first radio-frequency signal containing a predetermined pseudo-noise code signal toward the base station;

second means provided in the mobile station for detecting a first timing at which the first means transmits the first radio-frequency signal;

third means provided in the base station for receiving the first radio-frequency signal transmitted from the first means in the mobile station, and for repeating the first radio-frequency signal and transmitting the first radio-frequency signal as a second radio-frequency signal toward the mobile station;

fourth means provided in the mobile station for receiving the second radio-frequency signal transmitted from the third means in the base station after the first means in the mobile station transmits the first radio-frequency signal;

fifth means provided in the mobile station for converting the second radio-frequency signal received by the fourth means into a baseband signal;

a memory provided in the mobile station and storing the predetermined pseudo-noise code signal;

sixth means provided in the mobile station for calculating a correlation between the baseband signal generated by the fifth means and the predetermined pseudo-noise code signal stored in the memory;

seventh means provided in the mobile station for detecting a second timing at which the correlation calculated by the sixth means peaks substantially; said seventh means comprising:

first sub-means for differentiating the calculated correlation into a differentiation result;

second sub-means for deciding whether or not the differentiation result generated by the first sub-means becomes smaller than a predetermined reference value; and     third sub-means for using a timing at which the second sub-means decides that the differentiation result becomes smaller than the predetermined reference value as the second timing at which the calculated correlation peaks substantially;

eighth means provided in the mobile station for calculating a time interval between the first timing detected by the second means and the second timing detected by the seventh means; and ninth means provided in the mobile station for calculating a distance between the mobile station and the base station on the basis of the time interval calculated by the eighth means.

3. A radio communication system as recited in claim 2, wherein the seventh means in the mobile station comprises:

first sub-means for differentiating the calculated correlation into a differentiation result;

second sub-means for deciding whether or not the differentiation result generated by the first sub-means becomes smaller than a predetermined reference value; and     third sub-means for using a timing at which the second sub-means decides that the differentiation result becomes smaller than the predetermined reference value as the second timing at which the calculated correlation peaks substantially.

4. A radio communication apparatus in a mobile station which can communicate with a base station radio, the base station having a function of repeating a received radio signal, the apparatus comprising:

first means for transmitting a first radio-frequency signal containing a predetermined pseudo-noise code signal toward the base station;

second means for detecting a first timing at which the first means transmits the first radio-frequency signal;

third means for receiving a second radio-frequency signal after the first means transmits the first radio-frequency signal;

fourth means for converting the second radio-frequency signal received by the third means into a baseband signal;

a memory storing the predetermined pseudo-noise code signal;

fifth means for calculating a correlation between the baseband signal generated by the fourth means and the predetermined pseudo-noise code signal stored in the memory;

a differentiator for differentiating the correlation calculated by the fifth means;

sixth means for deciding whether or not a value represented by an output signal of the differentiator becomes smaller than a predetermined reference value;

seventh means for detecting a second timing at which the sixth means decides that the value represented by the output signal of the differentiator becomes smaller than the predetermined reference value, the second timing being indicative of a timing at which the calculated correlation peaks substantially;

eighth means for calculating a time interval between the first timing detected by the second means and the second timing detected by the seventh means; and     ninth means for calculating a distance between the mobile station and the base station on the basis of the time interval calculated by the eighth means.

5. A radio communication system comprising:

a base station and a mobile station which can communicate with each other by radio;

first means provided in the mobile station for transmitting a first radio-frequency signal containing a predetermined pseudo-noise code signal toward the base station;

second means provided in the mobile station for detecting a first timing at which the first means transmits the first radio-frequency signal;

third means provided in the base station for receiving the first radio-frequency signal transmitted from the first means in the mobile station, and for repeating the first radio-frequency signal and transmitting the first radio-frequency signal as a second radio-frequency signal toward the mobile station;

fourth means provided in the mobile station for receiving the second radio-frequency signal transmitted from the third means in the base station after the first means in the mobile station transmits the first radio-frequency signal;

fifth means provided in the mobile station for converting the second radio-frequency signal received by the fourth means into a baseband signal;

a memory provide in the mobile station and storing the predetermined pseudo-noise code signal;

sixth means provide in the mobile station for calculating a correlation between the baseband signal generated by the fifth means and the predetermined pseudo-noise code signal stored in the memory;

a differentiator provided in the mobile station for differentiating the correlation calculated by the sixth means;

seventh means provided in the mobile station for deciding whether or not a value represented by an output signal of the differentiator becomes smaller than a predetermined reference value;

eighth means for detecting a second timing at which the seventh means decides that the value represented by the output signal of the differentiator becomes smaller than the predetermined reference value, the timing being indicative of a timing at which the calculated correlation peaks substantially;

ninth means provided in the mobile station for calculating a time interval between the first timing detected by the second means and the second timing detected by the eighth means; and     tenth means provided in the mobile station for calculating a distance between the mobile station and the base station on the basis of the time interval calculated by the ninth means.

6. A mobile communicating apparatus having a function of measuring a distance, comprising;

a radio portion for processing a radio frequency signal;

a first low pass filter for limiting a band to a baseband;

a distance measurement data store portion for storing distance measurement data of a pseudo noise code mainly used in a spread spectrum system;

a multiplier for multiplying an output signal of the first low pass filter and the distance measurement data;

an integrator for integrating an output signal of the multiplier;

a threshold value detector for monitoring an integration value of the integrator, and outputting a threshold value detection signal when detecting the integration value which is equal to or greater than a threshold value;

a differentiator for sampling an output signal of the integrator in response to a high rate clock signal equal to "n" times a distance measurement data clock signal, comparing the threshold value and the output signal of the integrator between clock pulses thereof, and outputting an arrival detection signal for the distance measurement data when it become sequel to or smaller than the threshold value;

a received data reproducing portion for reproducing received data from a received signal;

a memory for storing at least processing delay times caused in the radio portion, the first low pass filter, and a second low pass filter indicated later;

a data transmission portion for transmitting at least the distance measurement data and processing delay time data of the radio portion, the first low pass filter, and the second low pass filter indicated later; and the second low pass filter for limiting a band of a transmission signal.

* * * * *